US008561576B2

(12) United States Patent
Pingsterhaus

(10) Patent No.: US 8,561,576 B2
(45) Date of Patent: Oct. 22, 2013

(54) CHUTE FOR IMMOBILIZING LIVESTOCK

(76) Inventor: Brian Pingsterhaus, Germantown, IL (US)

( * ) Notice: Subject to any disclaimer, the term of this patent is extended or adjusted under 35 U.S.C. 154(b) by 294 days.

(21) Appl. No.: 12/974,628

(22) Filed: Dec. 21, 2010

(65) Prior Publication Data
US 2011/0146591 A1 Jun. 23, 2011

Related U.S. Application Data

(60) Provisional application No. 61/289,261, filed on Dec. 22, 2009.

(51) Int. Cl.
*A01K 15/04* (2006.01)

(52) U.S. Cl.
USPC .......................................... 119/732; 119/752

(58) Field of Classification Search
USPC ......... 119/731–737, 724, 751, 722, 520, 524, 119/712, 723, 752
See application file for complete search history.

(56) References Cited

U.S. PATENT DOCUMENTS

| | | | | |
|---|---|---|---|---|
| 2,477,213 A * | 7/1949 | Staggs | ......................... | 119/723 |
| 2,674,980 A * | 4/1954 | Bentley | ........................ | 119/723 |
| 2,713,326 A * | 7/1955 | Basil | ............................ | 119/723 |
| 3,058,447 A * | 10/1962 | Neuenschwander | .......... | 119/751 |
| 3,960,113 A * | 6/1976 | Kratky | ........................... | 119/723 |
| 4,162,685 A * | 7/1979 | Knappenberger | ............ | 119/723 |
| 4,195,595 A * | 4/1980 | Shimonovich | ................ | 119/724 |
| 4,228,766 A * | 10/1980 | Wedman | ........................ | 119/723 |
| 4,567,854 A * | 2/1986 | Burns | ............................ | 119/723 |
| 5,469,808 A * | 11/1995 | Street et al. | .................... | 119/520 |
| 5,669,332 A | 9/1997 | Riley | | |
| 2009/0078217 A1* | 3/2009 | Riley | ............................. | 119/723 |
| 2010/0319630 A1* | 12/2010 | Treadway et al. | ............. | 119/724 |

FOREIGN PATENT DOCUMENTS

GB 2046068 A * 11/1980

* cited by examiner

*Primary Examiner* — Kristen C Hayes
(74) *Attorney, Agent, or Firm* — Husch Blackwell LLP

(57) ABSTRACT

A portable chute for immobilizing an animal having a frame structure configured to receive an animal, an entrance gate having a movable retainer member associated therewith for selectively engaging the rear portion of the animal, an exit gate having a selectively movable stanchion member for adjustably controlling the size of an opening associated therewith for immobilizing the head and neck area of the animal, at least one belly strap associated with an elongated arm operatively coupled thereto for engaging the animal's midsection when positioned within the frame structure, and an arm assembly operatively connected to the frame structure for pivotally rotating the entire chute between an upright vertical loading/unloading position and a horizontal operative position for treating the hooves of the animal. The chute assembly can be mounted to the bed of a vehicle and is always maintained in its vertical position above ground level. The vehicle may include a stabilizer assembly for further supporting the vehicle when the chute is pivotally rotated between its horizontal and vertical positions.

23 Claims, 8 Drawing Sheets

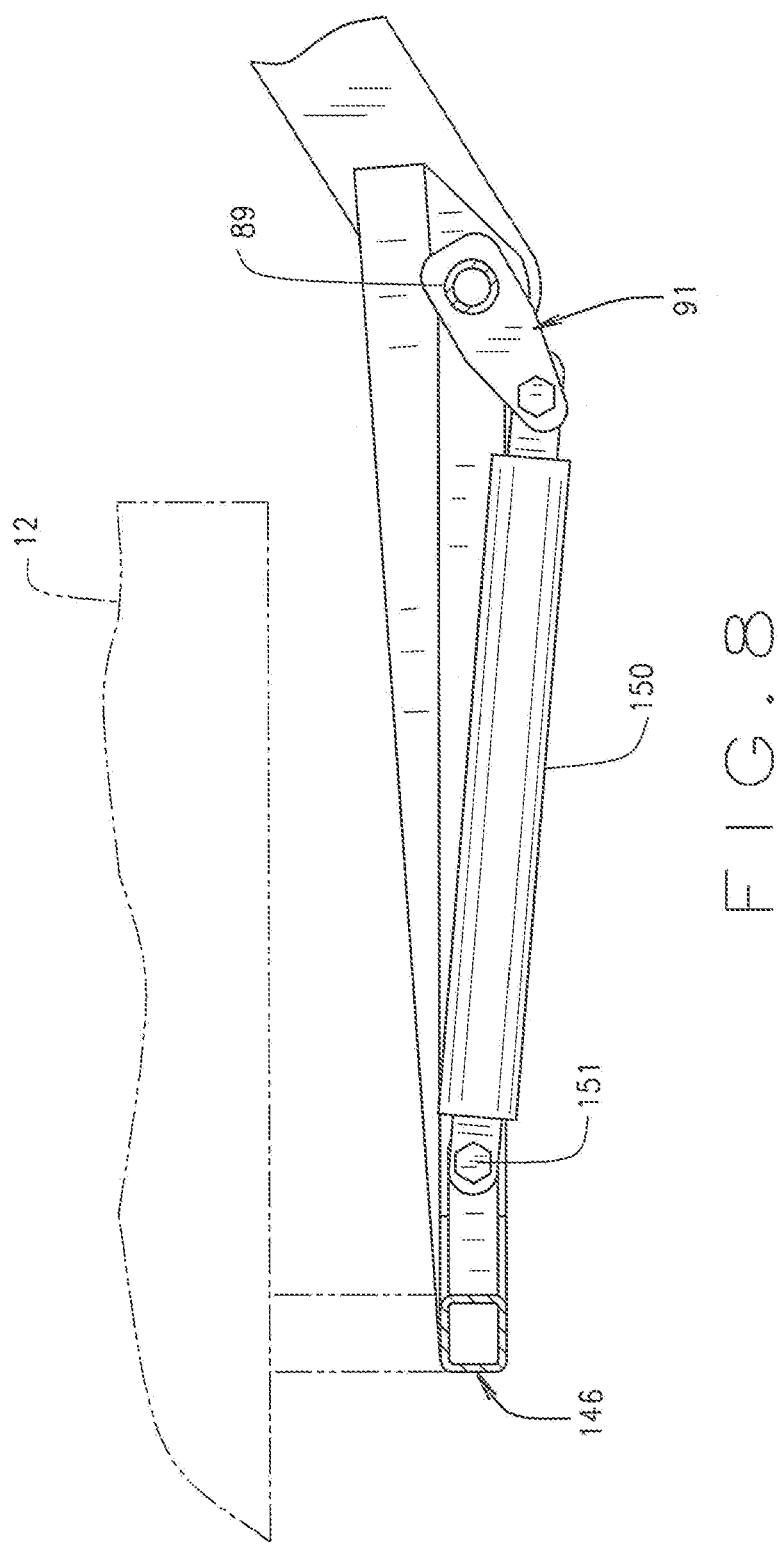

CHUTE FOR IMMOBILIZING LIVESTOCK

BACKGROUND OF INVENTION

The present invention relates generally to livestock chutes and, more particularly, to an apparatus for immobilizing an animal for various treatments including trimming the hooves of cattle.

Livestock chutes for confining and controlling animals, specifically cows, have been in use for many years. A typical chute provides an elongated space into which one animal at a time may be driven. The chute is usually provided with an entry or tailgate which is opened as the animal is driven into the chute. Once the animal is driven into the chute, the tailgate is closed preventing the animal from backing out of the chute.

It has been a routine procedure to trim the claw on the hooves of certain animals for various reasons. If the claw of these animals becomes too long, the animals are likely to experience severe discomfort which, in turn, can cause disease and/or seriously affect milk production.

Natural settings of animals are ever so changing as time goes along. For example, modem dairy farms are mostly closed confinement areas. This requires the animal to stand on concrete most of the time, which increases the risk of lameness which results in production loss. Laminitis, such as toe ulcer, white line disease, heel erosion, double sole, sole ulceration, acute and chronic laminitis, is a disease of the digital laminae of the hoof and is the single most important cause of lameness in a herd. Lameness in livestock has become a costly clinical disease in cattle. Accordingly, most dairy farmers have the hooves of their dairy cattle trimmed by a professional technician at scheduled intervals.

Recently, hydraulic power driven chutes have been developed in which a livestock animal is held while its hooves are being trimmed. The known prior art chute includes a rectangular, box-like structure that is pivotally mounted onto the bed of a vehicle. The chute is rotated between its horizontal position and its vertical position by hydraulically-actuated units. The known chute further includes four legs to support the chute on the ground in its vertical position. Each of the support legs generally includes a telescoping portion which is adjustable to level the chute with the ground. The entrance gate is hinged to the rear end of a wall and is latched in its closed position by a latch. The exit gate is hinged to the front end of a wall and is moved between an open and closed position by a hydraulic unit and is latched with a releasable latch.

A stanchion is pivoted on the exit gate and is movable between its open position and a closed position wherein the head of the animal is immobilized. After the hooves are trimmed, the chute is rotated back to its original position to put the animal back onto its feet. The operator releases the head of the animal and opens the exit gate of the chute so the animal can be herded out of the chute. The exit gate is then closed and latched so that the next animal can be herded into the chute. When an animal is in the chute, it is further immobilized through the use of one or more belly straps, each of which is wound or unwound to engage or disengage the underside of the belly portion of the animal. See, for example, U.S. Pat. No. 5,669,332.

While the known livestock chutes for immobilizing an animal are effective for their purposes, they do have certain deficiencies. A major drawback with the known chute is the adjustment mechanism required for leveling the legs supporting the chute on uneven ground surfaces. Moreover, some ground environments such as a wet or flooded field could prevent the chute from being used in such an environment due to the instability associated with both holding and/or leveling the legs in a muddy field.

Further, when an animal is in the chute and the chute is rotated for the trimming process, the belly straps engaged with the underside of the belly portion for immobilizing the animal are not sufficient enough to support the large body of the animal. In addition, the mechanism used to wind up or tighten the belly straps around the animal is antiquated and cumbersome. This can cause discomfort to the animal and safety issues for both the animal and the technician involved. There is therefore a need for an improved supporting system for the chute.

Further, it would be desirable to provide an additional support member for holding the animal in its proper restrained position within the chute to enhance immobility, efficiency and safety.

The present invention provides an advance in the art by providing a free-standing animal chute without any supporting legs extended from the bottom of the chute and it likewise provides for additional immobilizing means for efficiently holding an animal in a restricted position within the chute.

SUMMARY OF INVENTION

In one embodiment, the present invention involves the provision of a free-standing chute designed to provide safe access to an animal's hooves. This is accomplished through a stationary, free-standing portable chute that secures and restrains the animal, then lifts and turns the animal about 90 degrees onto its side for hoof inspection and maintenance. Once the inspection and maintenance is completed, the animal is rotated back onto its feet and processed through the chute's exit gate.

Operationally, the animal enters the free-standing chute through an entrance gate and continues passage until its head extends through an opening formed in the exit gate. The exit gate includes a movable bar or stanchion member to further secure the animal's head. The movable stanchion member functions to adjust and change the size of the opening associated with the exit gate to restrain the animal's head and neck during inspection and maintenance of the hooves. The entrance gate is then manually or hydraulically closed behind the animal to further secure the animal within the chute. The entrance gate is self-locked by a manual cam-lock upon closing of the gate thereby securing the animal within the chute and not allowing the animal to back out of the chute. After the entrance gate is closed, hydraulically activated straps are used to cradle the animal's midsection. In addition, a movable retainer arm is associated with the entrance gate and provides further restraint and immobilization to the rear portion of the animal. Once the animal is secured and restrained inside the chute with the exit gate stanchion member properly positioned, and the belly straps and the retainer arm moved to their restrained positions, the chute is then hydraulically lifted and pivoted into a horizontal position. Once in this position, the animal's legs can be safely secured with straps or chains which will ensure the safety of the animal as well as the safety of the hoof technician. After the hoof technician finishes inspection and maintenance, the chute is hydraulically returned to a vertical position where the belly straps are removed, stanchion security is relieved, the movable retainer arm is disengaged, and the front entrance gate is opened so as to permit the animal to exit.

The present chute includes a top portion connected to two spaced apart side walls, an open bottom portion, an entrance gate and an exit gate. In one embodiment the present chute is a free-standing chute designed to be mounted on a stand, trailer, truck bed or other vehicle. Once in place, no portion of the present chute touches the ground. To achieve this end, an arm assembly is provided to pivotally move the chute through an arc between a horizontal position and a vertical, upright position, the arm assembly being capable of supporting the chute and the animal restrained therein in both its vertical and horizontal positions. The arm assembly includes two arm members for attaching to the chute and at least one pin member attached to the respective arm members for rotating the arm assembly when the pin member is rotated, although other configurations are also possible. The arm assembly with the chute attached thereto is attached to the vehicle in a conventional manner such as through the use of a frame structure associated with the bottom of the vehicle. This structure can include a pair of elongated arm members extending from opposite sides of the under portion of the vehicle bed positioned and located to engage the pin member. The arm assembly is rotatable via a fluid-operated cylinder unit attached to both the pin member and the under portion of the vehicle bed. The present chute is pivotally mounted to the rotatable arm assembly which holds the chute above the ground when in its vertical position.

To provide support to the vehicle, a stabilizer assembly attached to the back portion of the vehicle bed can be used. The stabilizer assembly may include two pivotally extending elongated stabilizer arms, and a pair of hydraulic cylinders with associated piston rods. The stabilizer arms, each of which terminates in a foot portion adapted for engagement with the ground, are pivotally moved by a corresponding cylinder unit. The stabilizer arms pivot about pivot points in a downward direction to engage the ground to provide further support to the vehicle.

The entrance gate is designed to secure the rear portion of the animal when it is closed and locked with a manual cam-lock which ensures that the animal cannot back out of the chute. The entrance gate also includes a hydraulically activated retainer arm that extends toward and contacts the rear portion of the animal for further animal stabilization. The retainer arm includes an elongated U-shaped bar member and pivot points attached near the top of the entrance gate. The bottom of the elongated U shaped retainer arm contacts the animal in the area of the back portion of its thighs (Escutcheon). The overall function of the retainer arm is to further ensure that the animal is secure and restrained while in the chute and during rotation between its vertical and horizontal positions.

The exit gate is a manually or hydraulically operated control gate and includes a hydraulically controlled head retaining movable bar or stanchion member. The hydraulically activated mechanism for moving the head retaining stanchion member is part of the exit gate and when activated, adjusts the size of the opening associated with the exit gate to secure and restrain the animal's head therewithin for safe operation. The movable stanchion member is a single point, bottom pivoting mechanism which affords the operator a finer range of control needed to adequately secure the animal's head within the exit gate.

To further immobilize the animal and ensure safe operation, belly straps securely cradle the animal's midsection as accomplished through the operation of a hydraulically controlled arm to which a pair of the belly straps are attached. One end of the straps are statically attached to opposite sides of the hydraulically activated arm, while the opposite end of the straps are attached to one of the chute side walls. These straps are then positioned under the belly portion of the animal and when activated, draw tight around the animal's midsection to further support and immobilize the animal within the chute.

BRIEF DESCRIPTION OF DRAWINGS

FIG. 8 is a partial cut-away side elevational view taken along line 8-8 of FIG. 6 showing the fluid-operated cylinder unit for partially rotating the chute attached to both the vehicle and the chute arm assembly.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to see may have been omitted. It should also be understood that the invention is not necessarily limited to the particular embodiments illustrated herein. Like numbers utilized throughout the various Figures designate like or similar parts or structure.

DETAILED DESCRIPTION

Before describing the present invention, it will be understood that variations of the disclosed structure may be applied in combination with various fixed stands, trailers, truck beds, vehicles or other devices, and the present invention is not limited to the specific examples described herein.

Figure 1:
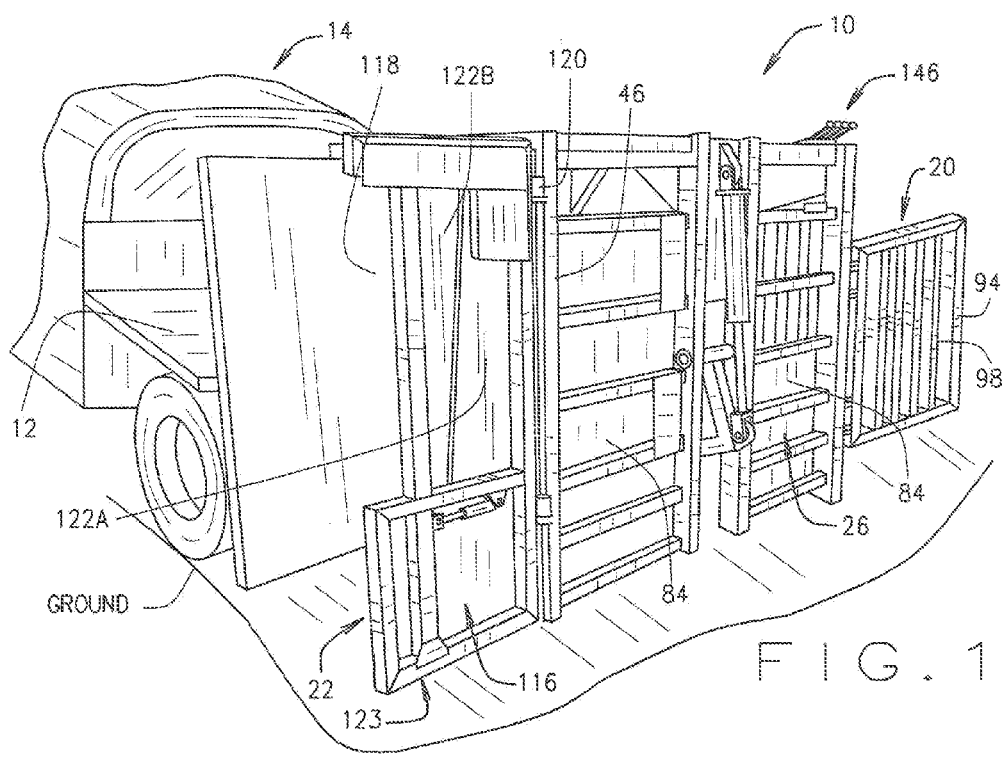
FIG. 1 is a perspective view of the present portable chute constructed in accordance with the teachings of the present invention showing the present chute in its vertical position relative to a vehicle on which the chute is pivotably mounted.
Figure 2A:
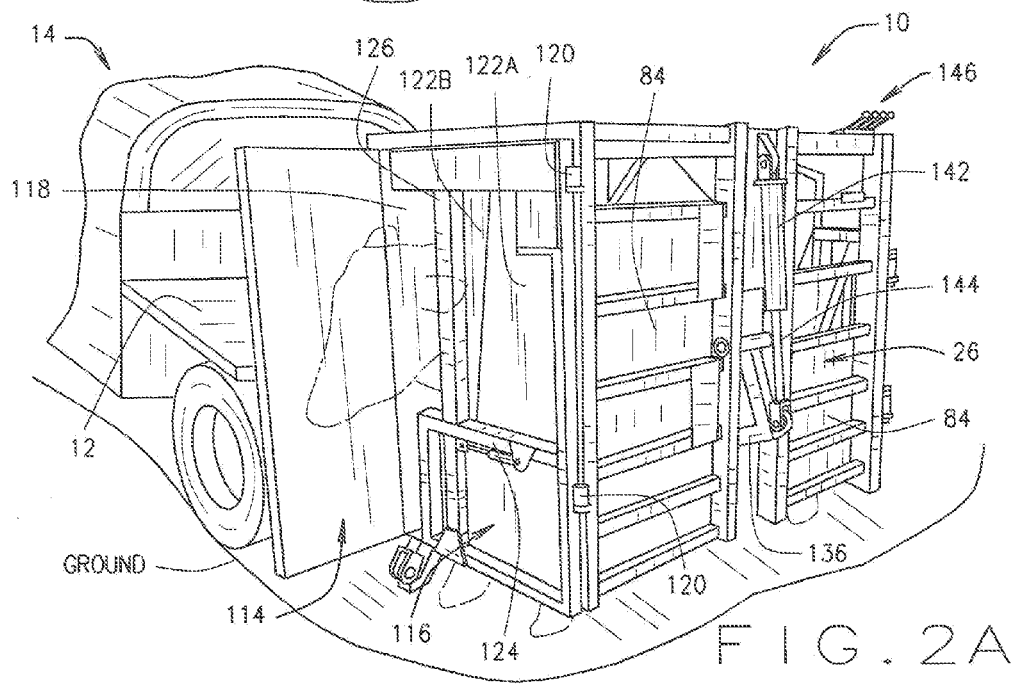
FIG. 2A is a perspective view of the chute and vehicle of FIG. 1 showing the chute in its upright vertical position with a cow positioned therein.
Figure 2B:
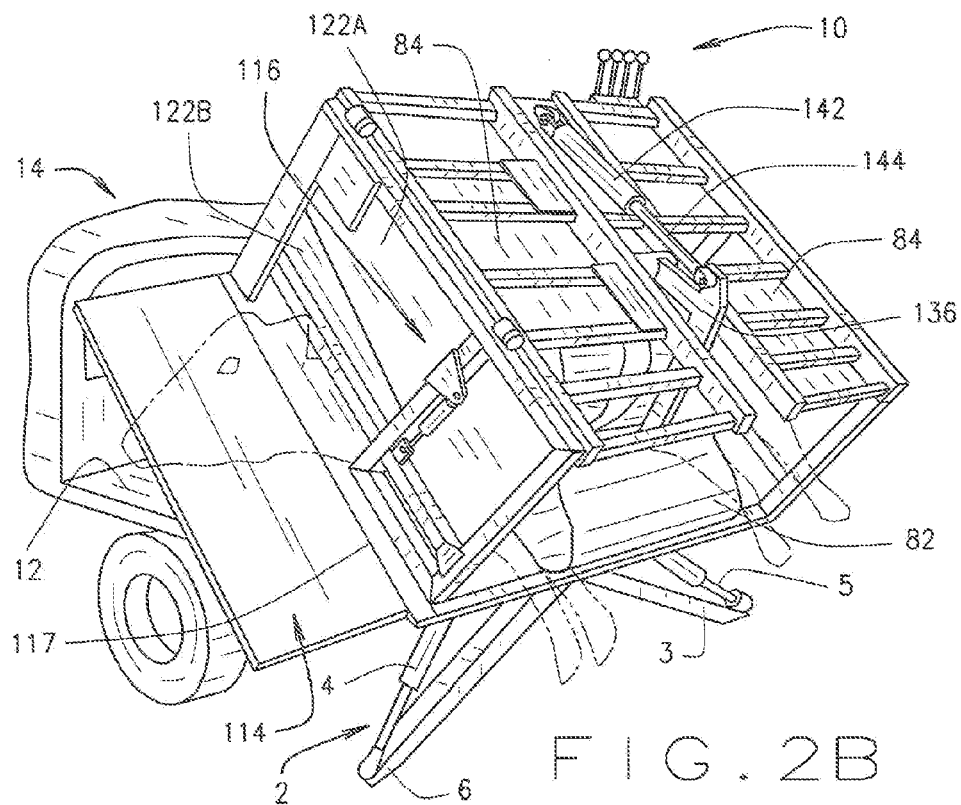
FIG. 2B is a perspective view of the chute and vehicle of FIG. 1 with the chute in a partially rotated position with a cow positioned therein.
Figure 2C:
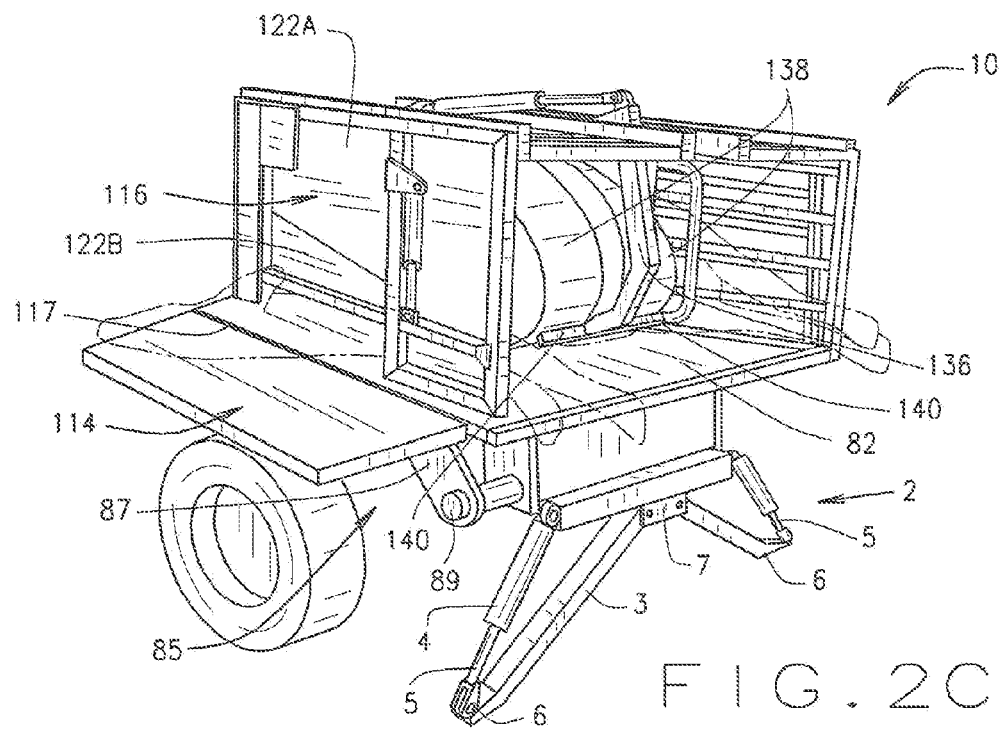
FIG. 2C is a perspective view of the chute and vehicle of FIG. 1 with the chute in its horizontal position with a cow positioned therein.
Figure 6:
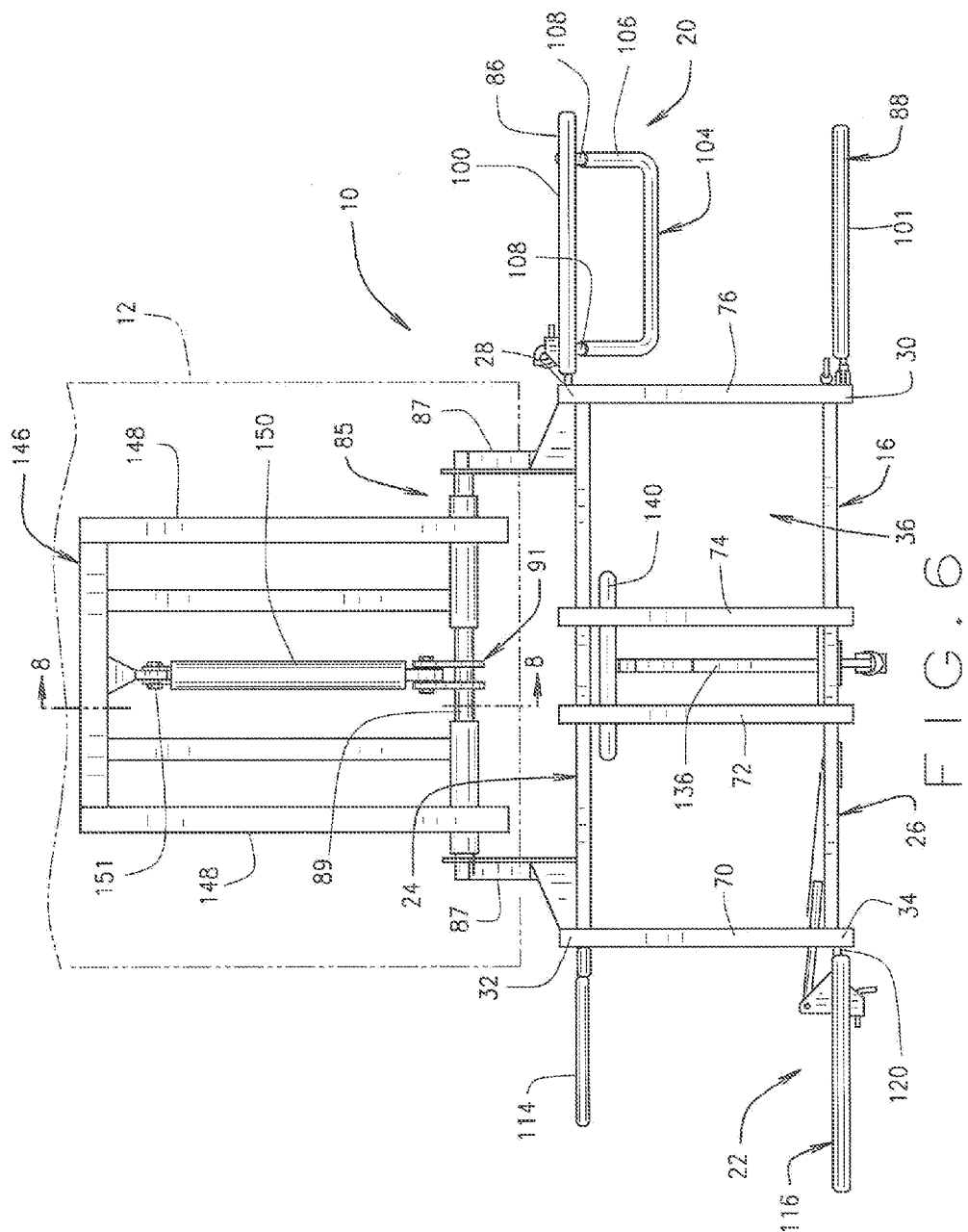
FIG. 6 is a top plan view of the chute of FIG. 1 showing one embodiment of the framework structure and fluid-operated cylinder unit associated with the vehicle for pivotally rotating the chute.

Referring to FIGS. 1-2C, the present animal chute 10 is illustrated in accordance with the teachings of the present invention as it is pivotably mounted onto the bed 12 of a vehicle 14 about a stabilizer assembly 2 as best shown in FIGS. 2B and 2C. More particularly, FIGS. 1 and 2A show an animal chute 10 in its upright, vertical or animal loading and unloading position while FIG. 2C shows the chute 10 in its horizontal or hoof-trimming operative position as well as its storage and transportable position on the bed 12 of the vehicle 14. Chute 10 is rotatable between its horizontal position and its vertical position by one or more fluid-operated cylinders or the like such as cylinder unit 150 as best illustrated in FIGS. 6 and 8. As used herein throughout this specification "fluid-operated" or "hydraulically operated" is meant to include hydraulically actuated and/or pneumatically operated, cylinder type units which are well-known and understood in the art.

In one embodiment, a stabilizer assembly 2 can be used to help support the weight of the present chute 10 and the animal restrained therein on the vehicle 14. This is particularly true when the chute 10 is in its horizontal operative position on the vehicle bed 12 as shown in FIG. 2C. Referring to FIGS. 2B and 2C, the stabilizer assembly 2 includes two pivotally extending elongated stabilizer arms 3, and a pair of hydraulic cylinders 4 and associated piston rods 5. The stabilizer arms 3, each of which terminates in a foot portion 6 adapted for engagement with the ground, are pivotally moved by forward movement of the piston rods 5 associated with the cylinders 4. The stabilizer arms 3 pivot about pivot points 7 in a downward direction to engage the ground to provide additional support to the vehicle bed 12. It is also recognized and anticipated that other types of stabilizing mechanisms for the vehicle 14 can also be used in association with the present invention without departing from the spirit and scope of the invention.

Figure 4:
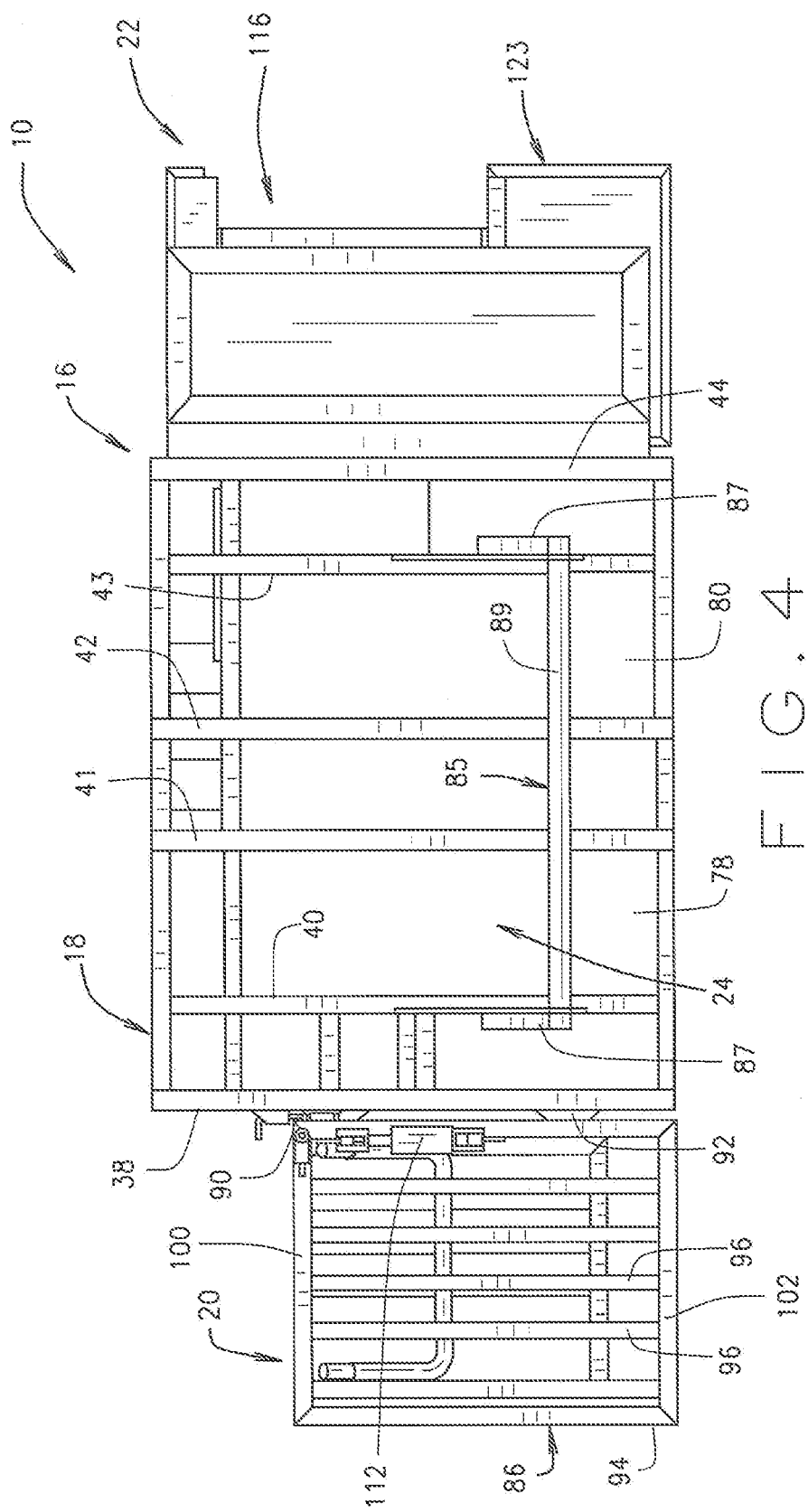
FIG. 4 is a side elevational view of the inner side of the chute of FIG. 1 facing towards the vehicle.

A rotatable arm assembly 85 is provided to pivotally move the chute 10 through an arc of travel between its horizontal operative position and its vertical, upright loading/unloading position, and to support the chute 10 throughout its full range of travel and at its horizontal and vertical positions as shown in FIGS. 2A-2C. The arm assembly 85 includes two arm members 87 which are fixedly attached at one end portion thereof to at least one rotatable pin or bar member 89 and at their opposite end portions to the chute side wall 24 as best illustrated in FIGS. 4 and 6. The pin member 89 includes a pair of flanges or clevis 91 for attaching to the rod portion of a fluid-operated cylinder 150 associated with the vehicle 14 as best illustrated in FIGS. 6 and 8. The pin member 89 is attached to the underside of the vehicle 14 in any conventional manner such as through the framework structure 146 illustrated in FIG. 6. In the embodiment of FIG. 6, the frame structure 146 includes at least a pair of elongated arm members 148 extending from opposite sides of the under portion of the vehicle bed 12 and positioned and located to engage and/or hold the pin member 89 for rotation. This rotational engagement can be accomplished by any suitable known means. The fluid operated cylinder unit 150 is fixedly attached to the vehicle 14 such as at point 151 and has its rod member attached to the flanges 91. Reciprocal movement of the rod of cylinder 150 will pivotally rotate the chute 10 between its vertical (FIGS. 1 and 2A) and horizontal (FIG. 2C) positions in a conventional manner. The arm assembly 85 holds the chute 10 above the ground when in its vertical position as illustrated in FIGS. 1 and 2A.

FIGS. 1, 3, 4, and 6 illustrate the present livestock chute 10 for confining and controlling animals, typically cattle, for various treatments thereof. In one embodiment, the chute 10 includes a three-dimensional framework structure 16 which forms an elongated, substantially rectangular, three-sided box-like structure as best shown in FIG. 6. The chute 10 generally includes a top portion 18 connected to a pair of spaced apart side walls 24 (FIGS. 4) and 26 (FIG. 3) having upper and lower end portions and entrance and exit end portions as will be hereinafter further explained. An entrance gate 20 is operatively secured to one end 28 and 30 of the side walls 24 and 26 (FIG. 6) and is adapted to pivot between open and closed positions. An exit gate 22 is operatively secured to the opposite end 32 and 34 of the side walls 24 and 26 (FIG. 6) and is also adapted to pivot between open and closed positions. The opposing side walls 24 and 26 are connected to each other through transverse cross support members 70, 72, 74 and 76 illustrated in FIG. 6, inner side wall 24 being located on the side adjacent to and abutting the vehicle bed 12 and outer side wall 26 being located on the side facing away from the vehicle bed 12.

Figure 3:
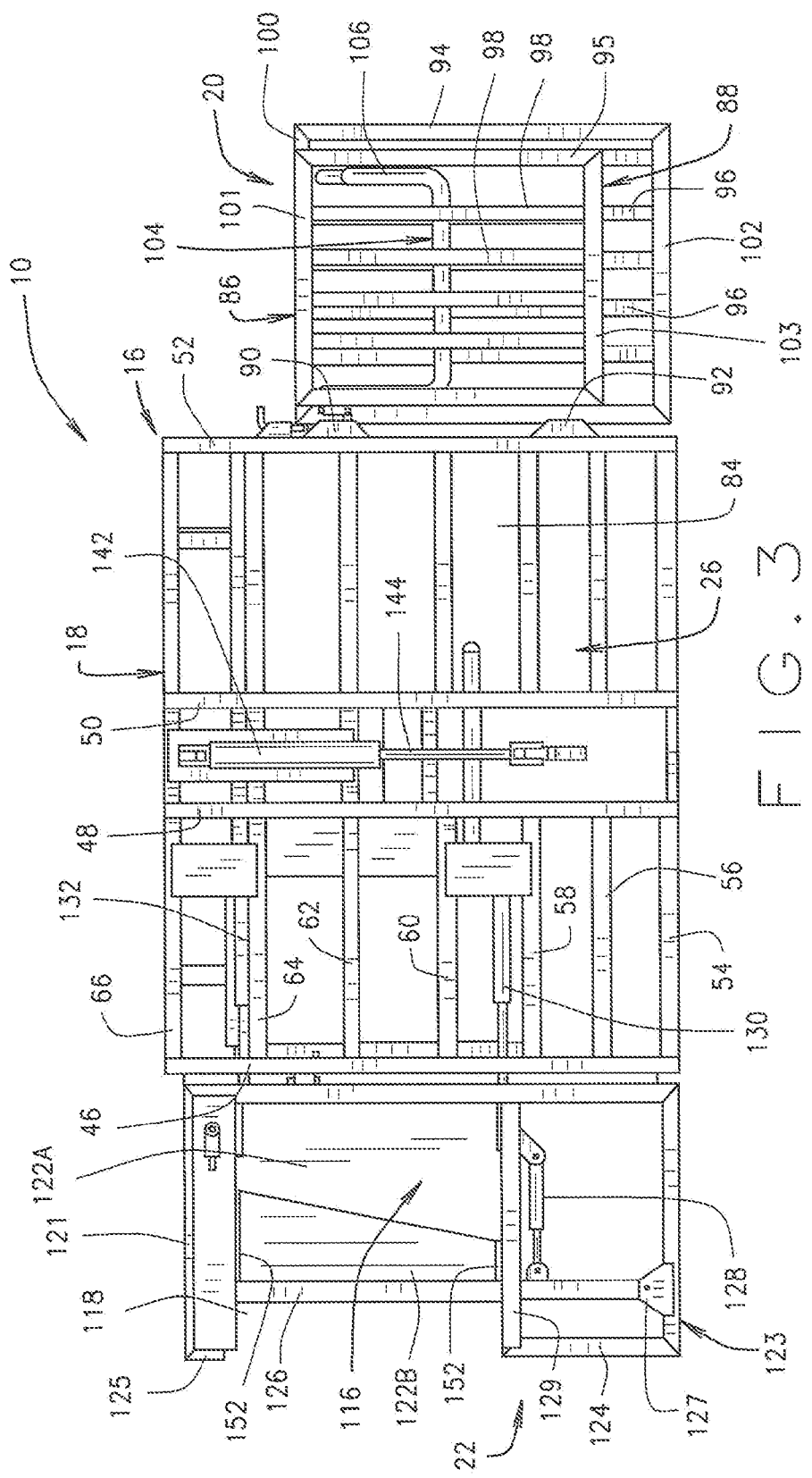
FIG. 3 is a side elevational view of the outer side of the chute of FIG. 1 facing away from the vehicle.

The side walls 24 and 26 are laterally spaced apart from each other, as best illustrated in FIG. 6, to provide an elongated space 36 into which an animal may be driven. Each of the side walls 24 and 26 is defined by vertical structural members namely, structural members 38, 40, 41, 42, 43, 44 associated with the inner side wall 24 (FIG. 4) and structural members 46, 48, 50, 52 associated with the outer sidewall 26 (FIG. 3). Each side wall 24 and 26 also includes a plurality of corresponding horizontal structural members such as the structural members 54, 56, 58, 60, 62, 64, 66, associated with the side wall 26. The structural members of each of the side walls 24 and 26 may be connected together by structural transverse cross support members 70, 72, 74, 76 as shown in FIG. 6. The side walls 24 and 26 are extended from and supported solely from the top portion 18, allowing no bottom cross members or obstruction to the animal during loading and unloading, and when the animal is restrained therewithin. There are no cross members or other obstructions associated with the bottom portion of the chute 10, and with the bottom portion of the respective side walls 24 and 26 including no leg members or other supports touching the ground when the chute 10 is in its vertical position. In this regard, the present free-standing chute 10 gives an operator the option to hydraulically lift the chute 10 over the animal in cases where the animal chooses to lie down in the chute 10. The present animal chute 10 also gives the animal its full range of lunge in the process of getting up and exiting the chute area safely with no restraints so that it helps with stress and reducing injuries to the animal.

As illustrated in FIGS. 2B, 2C and 4, the inner side wall 24 positioned adjacent to and abutting the vehicle bed 12 includes one or more solid panels 78, 80 (FIG. 4) which cover at least a portion of the side wall 24 and are secured to some of the structural members forming the side wall 24. The side wall 24 can further include a solid sheet of a resilient material 82 (FIG. 2C), such as synthetic or natural rubber or plastic, which provides cushioning and support to the animal when the chute 10 is rotated to its horizontal position. The solid sheet 82 can be secured to the interior surface of the side wall 24. The opposite outer side wall 26 may also include one or more truncated panels such as the panels 84 that are secured or otherwise fixed to some of the structural members forming the side wall. In this regard, it is recognized that panels or sheets secured to the side walls 24 and 26 can be added or omitted without departing from the spirit and scope of the invention. The side walls 24 and 26 can be substantially open, or partially and/or fully covered. Although the shape of the framework 16 illustrated in FIGS. 1-6 is generally rectangular in shape, it is also recognized and anticipated that the chute 10 can take on any shape and dimension depending upon the types of animals to be restrained and treated therein.

The entrance gate 20 is generally comprised of a pair of cooperating gates 86, 88 provided at the rear of the chute 10 as best shown in FIG. 6. The gates 86, 88 are selectively movable between open and closed positions to allow an animal to enter the chute 10 and to prevent it from exiting rearwardly therefrom. The entrance gate 20 is designed to secure the rear end of the animal when the gates 86, 88 are manually or hydraulically closed and each gate can be self-locking with a conventional cam lock (not shown). One gate 86 simply spans the space between the vertical supports associated with the side wall end portions and may be attached to vertical structural member 38 (FIG. 4) associated with side wall 24 by hinges 90, 92 allowing the gate 86 to move from a closed position to an outwardly opened position allowing an animal to enter the rear of the chute 10. The other gate 88 is hingedly attached to vertical structural member 52 (FIG. 3) associated with the opposite side wall 26. The entrance gates 86 and 88 may swing either inwardly or outwardly toward their respective open positions. At least one of the entrance gates 86, 88 should be closed to prevent the animal from backing out of the chute 10. In addition, it is recognized and anticipated that entrance gate 20 may be comprised of just one single gate such as gate 86. Each of the entrance gates 86, 88 is provided with a frame 94, 95 forming a rectangular shape and vertical members 96, 98 spaced apart from each other. The elongated, vertical disposed members 96, 98 are positioned in a spaced apart relationship and connect the upper and lower end portions 100, 101, 102, 103 of the frames 94, 95 as best illustrated in FIGS. 3 and 7.

Figure 7A:
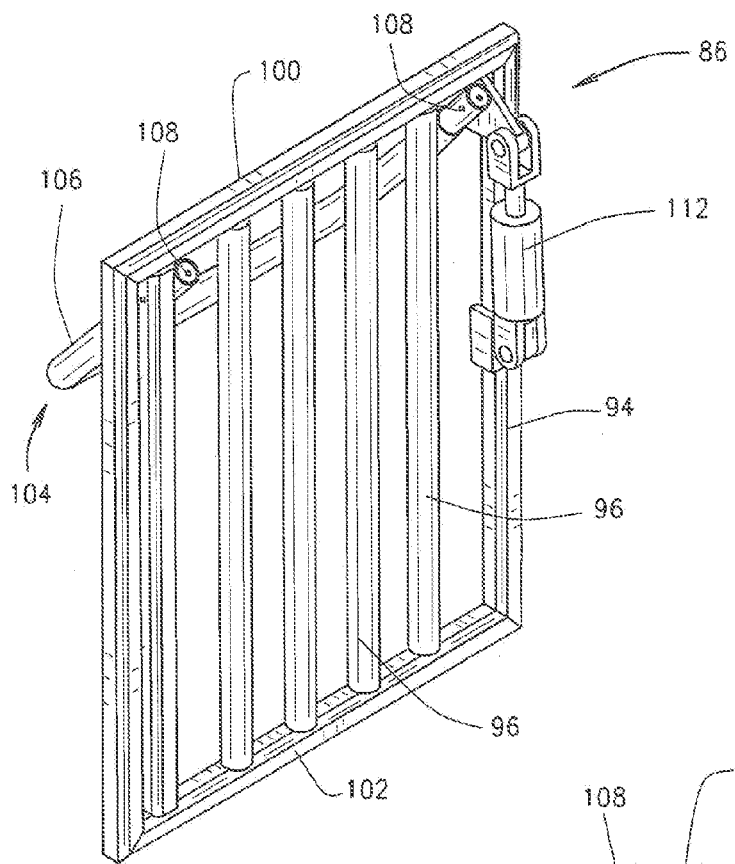
FIG. 7A is a fragmentary perspective view of a portion of the entrance gate showing the present retainer arm associated therewith constructed in accordance with the teachings of one embodiment of the present invention.
Figure 7B:
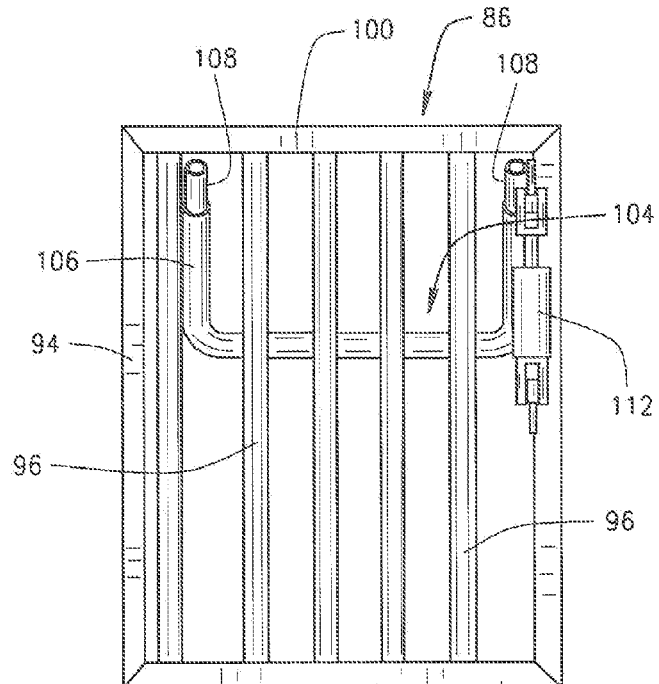
FIG. 7B is a fragmentary front elevational view of a portion of the entrance gate of FIG. 7A.

Retainer arm 104 is secured to one of the entrance gates 86, 88 as illustrated in FIGS. 3-6, 7A and 7B. The retainer arm 104 includes an elongated U-shaped arm 106 having terminal end portions 108 pivotally secured at both ends thereof to the gate assembly. The retainer arm 104 is operatively coupled to the top portion 100 of the entrance gate 86 by any suitable means and the fluid-operated cylinder unit 112 is coupled to one of the terminal end portions 108 as best illustrated in FIGS. 7A and 7B. The cylinder unit 112 pivotally moves the retainer arm 104 between its stored non-engaging position as illustrated in FIGS. 7A and 7B and its animal engaging operative position where the arm 104 engages the back portion of the animal when the entrance gate 86 is in its closed position. In one embodiment, the fluid-operated retainer arm 104 extends toward and contacts the animal for further animal stabilization. In its operating position, when the gate 86 is closed, the bottom portion 106 of the elongated U-shaped arm 104 is pivoted upwardly and selectively engages the animal adjacent the back of the animal's rear thighs approximately where the udder attaches to the torso. The technical veterinarian term as to where the retainer arm 104, contacts the rear portion of the animal is Escutcheon. The retainer arm 104 rests under and across the rear leg thighs and ensures that the back portion of the animal remains secure while in the chute 10. In this regard, it is recognized that the retainer arm 104 could take on many different shapes and can contact the restrained animal anywhere along its back portion. Fluid-operated cylinder piston 112 is provided at the upper end of entrance gate 86 for automatically moving the retainer arm 104 to its operating position. The cylinder 112 also maintains a pre-determined pressure against the gate arm 104 for holding the arm in contact with and under pressure against the animal's back portion. Once the chute 10 is rotated from its operative horizontal position to its loading and unloading vertical position after treatment, retainer arm 104 can be retracted to allow the animal's hip area to freely move.

An exit gate 22 is provided at the exit end of the chute 10 as illustrated in FIGS. 3-6. The exit gate 22 generally includes a manually movable gate 114, a manually or hydraulically movable gate 116, and a fluid-operated bar or stanchion member 126. The exit gates 114, 116 are selectively movable between open and closed positions to selectively permit and prevent at least the forward movement of the animal. During operation, gate 114 remains in its open position as illustrated in FIGS. 1 and 2 and serves as a platform or headrest for holding and supporting the animal's head and neck in a restrained position when the chute 10 is rotated to its horizontal operative position as illustrated in FIGS. 2B and 2C. The gate 114 can be a solid plate or any structure that will provide adequate support to the animal's head and neck area. In addition, the gate 114 can be manually or fluid operated, or the gate 114 could be made so as to be non-movable and function solely as a support plate. If movable, gate 114 can be closed when the chute 10 is not being used to conserve space during transport from one location to another. If movable, the gate 114 can be hingedly attached to the vertical structural support member 44 (FIG. 4) associated with inner side wall 24 or to any other chute member by any plurality of hinges positioned along line 117 (FIGS. 2B and 2C).

Figure 5:
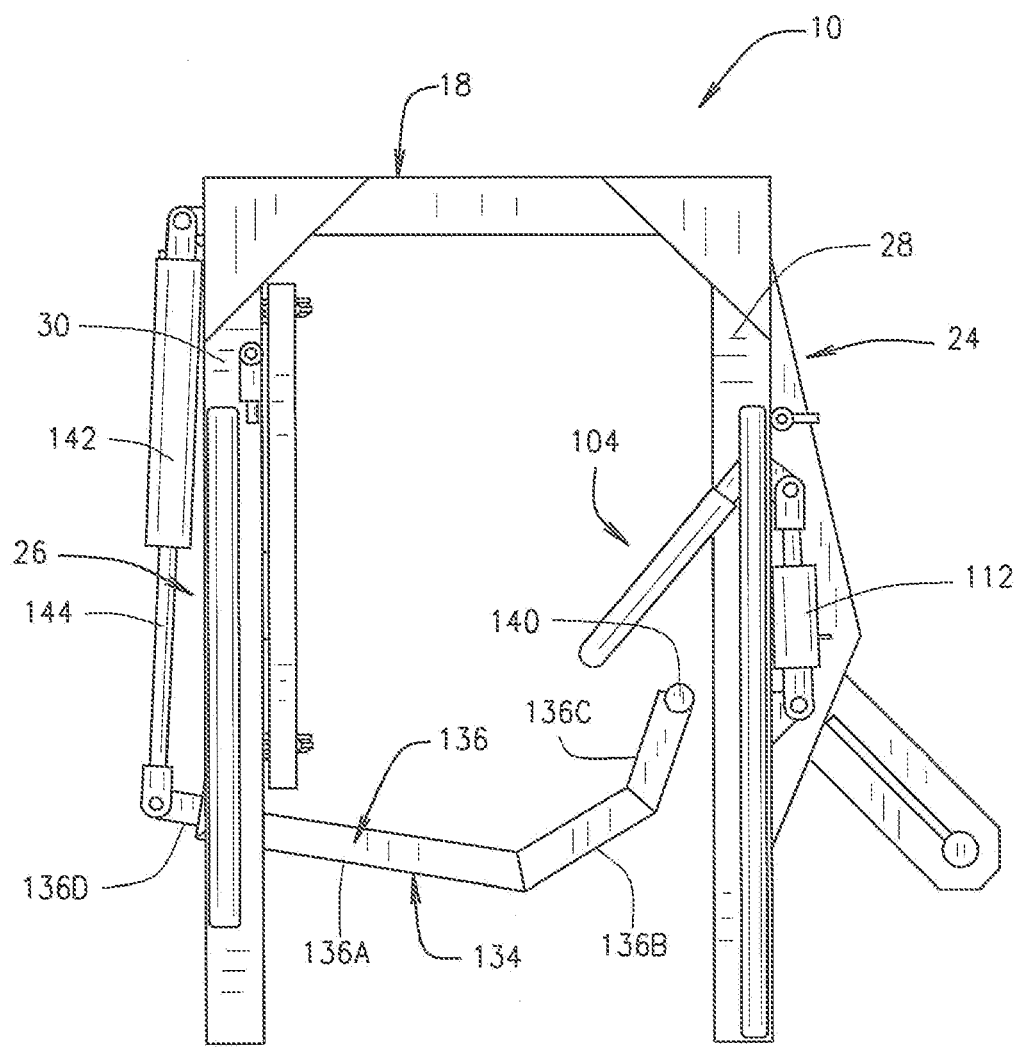
FIG. 5 is a rear elevational view of the chute of FIG. 1 looking through the opened entrance gate.

Exit gate 116 is likewise manually or hydraulically movable between its open position as illustrated in FIGS. 3-5 and its closed position as illustrated in FIGS. 1 and 2. Gate 116 includes a plate or panel 122A which may overlap with a panel 122B associated with the movable stanchion member 126. Gate 116 forms an opening 118 which is disposed between the movable bar or stanchion member 126 and open gate 114 as best shown in FIGS. 1 and 2. Movable bar 126 is hinged at pivot point 127 and moves through an arc via operation of fluid-operated cylinder 128. Stanchion member 126 is selectively movable to change the size of the opening 118 to allow an animal to exit the chute 10 after treatment and to restrain and prevent the animal from exiting forwardly therefrom during treatment. As the stanchion member 126 is moved between its fully opened and closed positions, the panel 122B attached thereto likewise moves with stanchion member 126 to keep the space between stanchion member 126 and panel 122A closed. This provides extra protection to both the animal and the technician and prevents the animal from extending any body parts through such space. Panel 122B overlaps with panel 122A throughout the range of travel of stanchion member 126 to keep this space closed.

The gate 116 spans the space between vertical supports 44 and 46 and is attached to vertical structural member 46 by any plurality of hinges 120 allowing the gate 116 to move between its open and closed positions. When in its closed position, terminal end portion 125 and frame member 124 lie substantially close to or abut gate 114. The opening 118 is formed in such a manner that the animal's head will extend out of the chute 10 through the opening 118 with its neck and head lying between gate 114 and the movable stanchion member 126. The fluid-operated cylinder 128 is located on the frame structure 123 as illustrated in FIG. 3 and is shielded so as to ensure a pinch free door operation. The hydraulically activated cylinder 128 is part of the head retaining mechanism 126 and when activated, secures the animal's head for safe operation. Also, the movable structure 126 is a bottom pivoting mechanism which affords the operator a finer range of control needed to secure the animal's head and neck.

Gate 116 includes a rectangular frame 123, vertical stanchion member 126 and panels 122A and 122B that form the majority of the surface area of gate 116. The frame structure 123 provides additional structural support to panel 122A. Stanchion member 126 is movable within corresponding slots or channels 152 formed in frame members 121 and 129. Gate 116 can also be moved between its open position and its closed position hydraulically through the use of fluid-operated cylinders 130 and 132 illustrated in FIG. 3. Extension and retraction of the rods associated with cylinders 130 and 132 will open and close gate 116 and it is held in these respective positions by a conventional latching mechanism (not shown).

An abdomen support assembly 134 may be provided intermediate the entrance and exit gates 20 and 22 as best illustrated in FIG. 5. In one embodiment, a pair of belly straps 138 are provided to further immobilize the animal and to ensure safe operation as illustrated in FIGS. 2B and 2C. Abdomen support assembly 134 is provided to securely cradle the animal's midsection as accomplished through the operation of a fluid-operated arm 136 to which the pair of belly straps 138 are attached. As illustrated, the relatively soft belly straps 138 are operatively coupled at one end to the inside portion of side wall 26 and at their other end to the transverse bars 140 associated with the terminal end portion of the elongated arm 136. The elongated arm 136 includes a plurality of sections 136A, 136B, 136C and 136D each rigidly affixed to each other to form an open partial loop or arcuate shape. In this regard, it is recognized that elongated arm 136 can include any plurality of sections including a lesser number of sections than those illustrated in the drawings, including a single arm member. Two transverse bar members 140 extend generally perpendicularly from the longitudinal axis of the elongated arm 136. The elongated arm 136 is mounted on and operatively coupled to a fluid-operated cylinder 142 and its associated piston rod 144 as best illustrated in FIG. 5. The belly straps 138 extend from the side wall 26 and attach to the transverse bar members 140 of elongated arm 136. When the cylinder 142 is activated, the belly straps 138 are moved so as to extend under the animal as illustrated in FIGS. 2B, 2C and 5 to provide further support and immobilization to the animal during rotation of the chute 10.

Movement of the chute 10, the stanchion member 126, abdomen support assembly 134 and retainer arm 104 is preferably provided by a fluid-operated system. The fluid-operated system which includes all of the fluid-operated cylinders 112, 128, 130, 132, 142 and 150 is powered by an electric motor, gas engine, or other means (not shown) associated with the vehicle 14 or the chute 10. All fluid controls such as hydraulic controls 146 are mounted on a panel (FIG. 1) at the rear of chute 10 or on the vehicle bed 12 so that they are easily accessible by an operator standing at the entry location to the chute 10. The hydraulic piston and cylinder assembly will of course be supplied by a source of fluid under pressure such as a hydraulic pump (not shown) and the controls therefor would likewise be located at any suitable location on the chute 10 or the vehicle 14. Other types of power control systems such as a pneumatic system could be utilized for moving the chute 10, the stanchion member 126, the belly straps 138 and the retainer arm 104 without departing from the spirit and scope of the invention. The controls 146 activate and control associated valves in a conventional hydraulic or pneumatic system in a conventional manner to control the movement and operation of the belly straps 138, the retainer arm 104, the stanchion member 126, the entrance and exit gates 20 and 22, and the chute 10.

Operation of the chute 10 is as follows. Exit gate 22 is manually and/or hydraulically closed by the operator. Entrance gate 20 is manually or hydraulically opened by the operator and an animal is herded into the chute 10. As the animal enters, her head is directed by the angularly oriented stanchion member 126 into opening 118. When the animal is fully within chute 10 and the entrance gate 20 is closed, the animal's head will extend completely out the front of chute 10 through opening 118. The stanchion member 126 is then moved into engagement with the animal's head and neck via cylinder 128 to immobilize the same. To further immobilize the animal for various treatments thereof and for rotation to the chute to its horizontal position, the belly straps 138 are pivotally moved via cylinder 142 to securely cradle the animal's midsection. The retainer arm 104 may then be brought into engagement with the back portion or rear hip area of the animal via cylinder 112 thereby further immobilizing the animal in the chute 10. Once the animal is correctly immobilized and secured (both gates 20 and 22 are closed, the animal's head is secured, and belly straps 138 appropriately tightened and the retainer arm 104 is engaged with the back of the animal), the whole chute mechanism 10 is ready to be hydraulically lifted and rotated into its horizontal operative position via fluid-operated cylinder 150. When cylinder 150 is actuated causing its associated rod to be retracted, chute 10 is partially rotated towards the top of the vehicle bed 12 to its horizontal position as illustrated in FIG. 2A-2C. The animal needs to be lifted as well as immobilized prior to pivoting the chute 10 so that its legs and other body parts do not drag or extend out of the chute while the chute is rotating. Once in its horizontal position, the animal's legs can be safely secured with straps or chains. In doing so, hoof technicians will be afforded the opportunity to safely access the animal's hooves.

After the trimming operation is completed, chute 10 is rotated back to its upright position. The hydraulic or pneumatic power is reversed to retract the arm 136 in the opposite direction thereby releasing the belly straps 138 and lowering the animal back onto its feet. In addition, the retainer arm 104 is retracted to disengage the hip portion of the animal and stanchion member 126 is then moved away from the animal's head and neck via cylinder 128 to enlarge the opening 118. Exit gate 22 is then opened manually or hydraulically and the animal is then herded out of the front of the chute 10. The exit gate 22 is then closed and entrance gate 20 is then opened so that the next animal can be herded into the chute. This entire operation can be accomplished by a single operator.

As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and other similar terms as used in the foregoing specification are used in the sense of "optional" or "may include" and not as "required".

Many changes, modifications, variations and other uses and applications of the present constructions will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow. The scope of the disclosure is not intended to be limited to the embodiments shown herein, but is to be accorded the full scope consistent with the claims, wherein reference to an element in the singular is not intended to mean "one and only one" unless specifically so stated, but rather "one or more." All structural and functional equivalents to the elements of the various embodiments described throughout this disclosure that are known or later come to be known to those of ordinary skill in the art are expressly incorporated herein by reference and are intended to be encompassed by the claims.

What is claimed is:

1. A chute for immobilizing an animal mounted on a supporting surface comprising:
    three-sided structure including a top portion connected to two laterally spaced apart side walls, each of said side walls extending downwardly from said top portion;
    an entrance gate pivotably connected to one end of said structure, said entrance gate being movable between an open position for allowing entry into said structure and a closed position for blocking exit from said structure;
    a retainer member pivotably connected to said entrance gate, said retainer member being selectively movable for engaging an animal positioned within said structure adjacent a rear portion of the animal, said retainer member being maintained under pressure against the rear portion of the animal;

an exit gate pivotably connected to the other end of said structure, said exit gate being movable between an open position allowing exit from said structure and a closed position blocking exit from said structure, said exit gate defining an opening wherein the head of an animal passes therethrough when the animal is position within said structure;

a first fluid-operated cylinder assembly adapted for pivotally rotating said structure; and an arm assembly operatively connected to said structure for connection to said first fluid-operated cylinder assembly for pivotally rotating said structure between a horizontal position on the supporting surface and an upright vertical position adjacent the supporting surface, said structure being supported by said arm assembly in its upright vertical position above the ground in a free-standing position wherein no portion of the structure touches the ground.

2. The chute of claim 1 wherein said retainer member includes an elongated U-shaped arm member positioned and located on said entrance gate for engaging the thighs of the animal in an area approximately where the udder attaches to the torso of the animal when said retainer member is moved into engagement with the animal.

3. The chute of claim 1 wherein said retainer member is connected to a second fluid-operated cylinder assembly for selectively moving said retainer member into and out of engagement with the animal.

4. The chute of claim 1 wherein said exit gate further includes a stanchion member pivotably mounted on said exit gate, said stanchion member being movable to change the size of the opening associated therewith whereby the head of the animal is immobilized with respect to said stanchion member.

5. The chute of claim 4 wherein said exit gate includes a pair of: first and second gates, said first gate being movable between an open and closed position and functioning as a headrest for the animal's head when moved to its open position, said second gate being movable between an open and closed position and including said movable stanchion member, said second gate mating with said first gate to define the opening therein when said first gate is in its open position and said second gate is in its closed position.

6. The chute of claim 1 further including:
at least one belly strap for further immobilizing the animal;
an elongated arm operatively coupled to said at least one belly strap; and
a third fluid-operated cylinder assembly for pivotably moving said elongated arm between a retracted position and an extended position, said at least one belly strap engaging the animal's midsection when in its extended position.

7. The chute of claim 1 wherein the supporting surface to which the chute is mounted includes a vehicle, the vehicle including a stabilizer assembly for further supporting the vehicle when said structure is pivotably rotated between its horizontal and vertical positions, said stabilizer assembly including two pivotably extending elongated stabilizer arms adapted for engagement with the ground.

8. The chute of claim 1 wherein said entrance gate includes a pair of first and second gates, said first and second gates being each movable between respective open and closed positions, said retainer member being pivotably connected to one of said first and second gates.

9. A chute for immobilizing an animal mounted for rotation on a supporting surface, said chute comprising:
a frame structure including a top portion and two laterally spaced apart side walls configured to receive an animal when positioned therewithin;
an entrance gate pivotably connected to one end portion of said frame structure, said entrance gate being movable between an open position for allowing entry into said frame structure and a closed position for blocking exit from said frame structure;
a retainer member pivotably connected to said entrance gate, said retainer member being selectively movable for engaging an animal positioned within said frame structure adjacent a rear portion of the animal, said retainer member including an elongated U-shaped arm member positioned and located on said entrance gate for engaging the thighs of the animal in an area approximately where the udder attaches to the torso of the animal, said retainer member applying a pre-determined pressure against the animal while in the frame structure;
an exit gate pivotably connected to the other end portion of said frame structure, said exit gate being movable between an open position allowing exit from said frame structure and a closed position blocking exit from said frame structure, said exit gate defining an opening wherein the head of an animal can pass therethrough when the animal is positioned within said frame structure, and a stanchion member pivotably mounted on said exit gate, said stanchion member being movable to change the size of the opening associated with said exit gate and to engage the head and neck area of an animal positioned within said frame structure so as to immobilize the head and neck area of the animal with respect to said stanchion member;
at least one belly strap for further immobilizing the animal when positioned within said frame structure, and an elongated arm member operatively coupled to said at least one belly strap, said elongated arm member being pivotably movable between a retracted position wherein said at least one belly strap is not in engagement with the animal and an extended position wherein said at least one belly strap engages the animal's midsection;
a first fluid-operated cylinder assembly adapted for pivotally rotating said frame structure between a vertical upright position adjacent the supporting surface and a horizontal position on the supporting surface;
an arm assembly operatively connected to said frame structure for connecting to said first fluid-operated cylinder assembly for pivotally rotating said frame assembly between its vertical upright position and its horizontal position, said frame structure being supported by said arm assembly in its vertical upright position above ground level.

10. The chute of claim 9 wherein said retainer member is connected to a second fluid-operated cylinder assembly for selectively moving said retainer member into and out of engagement with an animal, said second fluid-operated cylinder assembly maintaining the pre-determined pressure against said retainer member for holding said retainer member in contact with and under pressure against the animal.

11. The chute of claim 9 wherein said stanchion member is connected to a third fluid-operated cylinder assembly for pivotally moving said stanchion member to change the size of the opening associated with said exit gate.

12. The chute of claim 9 wherein said exit gate includes a pair of first and second gates, said first gate being movable between an open and closed position and functioning as a headrest for the animal's head and neck when moved into its open position, said second gate being movable between an open and closed position and including said movable stanchion member, said second gate mating with said first gate to define the opening therein when said first gate is in its open position and said second gate is in its closed position.

13. The chute of claim 9 wherein said elongated arm operatively coupled to said at least one belly strap is connected to a fourth fluid-operated cylinder assembly for selectively moving said at least one belly strap between its retracted and extended positions.

14. The chute of claim 9 wherein the supporting surface to which the chute is mounted includes the bed of a vehicle, the bed of the vehicle including a stabilizer assembly for further supporting the vehicle bed when said frame structure is pivotally rotated between its horizontal and vertical positions, said stabilizer assembly including two pivotally extending elongated stabilizer arms adapted for engagement with the ground.

15. The chute of claim 14 wherein said two pivotally extending stabilizer arms are each respectively connected to a fluid-operated cylinder assembly for extending and retracting said stabilizer arms into and out of engagement with the ground.

16. The chute of claim 9 wherein said entrance gate includes a pair of first and second gates, said first and second gates being each movable between respective open and closed positions, said retainer member being pivotally connected to one of said first and second gates.

17. A chute for immobilizing an animal mounted for rotation to the bed of a vehicle, said chute comprising:
a frame structure including a top portion and two laterally spaced apart side walls configured to receive an animal when positioned therewithin;
an entrance gate connected to one end portion of said frame structure, said entrance gate including a pair of first and second entrance gates each movable between an open position for allowing entry into said frame structure and a closed position for blocking exit from said frame structure;
a retainer member connected to one of said first and second entrance gates, said retainer member being selectively movable for engaging an animal positioned within said frame structure adjacent a rear portion of the animal, said retainer member being connected to a first fluid-operated cylinder assembly for selectively moving said retainer member into and out of engagement with an animal;
an exit gate connected to the other end portion of said frame structure, said exit gate including a pair of first and second exit gates each movable between an open position allowing exit from said frame structure and a closed position blocking exit from said frame structure, said first exit gate being movable between its open and closed position and functioning as a headrest for the animal's head and neck when moved into its open position, said second exit gate being movable between its open and closed position and mating with said first exit gate to define an opening therein when said first exit gate is in its open position and said second exit gate is in its closed position, said opening allowing the head and neck of an animal to pass therethrough when the animal is positioned within said frame structure, and a stanchion member mounted on said second exit gate, said stanchion member being movable to change the size of the opening and to engage the head and neck area of an animal positioned within said frame structure so as to immobilize the head and neck area of the animal with respect to said stanchion member, said stanchion member being connect to a second fluid-operated cylinder assembly for moving said stanchion member to change the size of said opening;
at least one belly strap for further immobilizing the animal when positioned within said frame structure, and an elongated arm member operatively coupled to said at least one belly strap, said elongated arm member being connected to a third fluid-operated cylinder assembly for selectively moving said at least one belly strap between a retracted position wherein said at least one belly strap is not in engagement with the animal and an extended position wherein said at least one belly strap engages the animal's midsection;
a fourth fluid-operated cylinder assembly adapted for rotating said frame structure between a vertical upright position adjacent the bed of a vehicle and a horizontal position on the bed of the vehicle; and
an arm assembly operatively connected to said frame structure for connecting to said fourth fluid-operated cylinder assembly for rotating said frame assembly between its vertical upright position and its horizontal position, said frame structure being supported by said arm assembly in its vertical upright position above ground level.

18. The chute of claim 17 wherein the bed of the vehicle to which the chute is mounted includes a stabilizer assembly for further supporting the vehicle bed when said frame structure is rotated between its horizontal and vertical positions, said stabilizer assembly including two pivotally extending elongated stabilizer arms adapted for engagement with the ground.

19. The chute of claim 18 wherein said two pivotally extending stabilizer arms are each respectively connected to a fluid-operated cylinder assembly for extending and retracting said stabilizer arms into and out of engagement with the ground.

20. A chute for immobilizing an animal mounted on a supporting surface comprising:
a three-sided structure including a top portion connected to two laterally spaced apart side walls, each of said side walls extending downwardly from said top portion;
an entrance gate pivotally connected to one end of said structure, said entrance gate including a pair of first and second gates, said first and second gates being each movable between respective open and closed positions for allowing entry into and for blocking exit from said structure;
a retainer member pivotally connected to one of said first and second entrance gates, said retainer member being selectively movable for engaging an animal positioned within said structure adjacent a rear portion of the animal;
an exit gate pivotally connected to the other end of said structure, said exit gate being movable between an open position allowing exit from said structure and a closed position blocking exit from said structure, said exit gate defining an opening wherein the head of an animal passes therethrough when the animal is position within said structure;
a first fluid-operated cylinder assembly adapted for pivotally rotating said structure; and
an arm assembly operatively connected to said structure for connection to said first fluid-operated cylinder assembly for pivotally rotating said structure between a horizontal position on the supporting surface and an upright vertical position adjacent the supporting surface, said structure being supported by said arm assembly in its upright vertical position above the ground.

21. A chute for immobilizing an animal mounted on a supporting surface comprising:
a three-sided structure including a top portion connected to two laterally spaced apart side walls, each of said side walls extending downwardly from said top portion;
an entrance gate pivotably connected to one end of said structure, said entrance gate being movable between an open position for allowing entry into said structure and a closed position for blocking exit from said structure;
a retainer member pivotably connected to said entrance gate, said retainer member being selectively movable for engaging an animal positioned within said structure adjacent a rear portion of the animal;
an exit gate pivotably connected to the other end of said structure, said exit gate including a pair of first and second gates, said first gate being movable between an open and a closed position and functioning as a headrest for the animal's head when moved to its open position, said second gate being movable between an open and a closed position and including a movable stanchion member, said second gate mating with said first gate to define an opening wherein the head of an animal passes therethrough when the animal is positioned within said structure and when said first gage is in its open position and said second gate is in its closed position, said stanchion member being movable to change the size of the opening whereby the head of the animal is immobilized with respect to said stanchion member;
a first fluid-operated cylinder assembly adapted for pivotally rotating said structure; and
an arm assembly operatively connected to said structure for connection to said first fluid-operated cylinder assembly for pivotally rotating said structure between a horizontal position on the supporting surface and an upright vertical position adjacent the supporting surface, said structure being supported by said arm assembly in its upright vertical position above the ground.

22. A chute for immobilizing an animal mounted for rotation on a supporting surface, said chute comprising:
a frame structure including a top portion and two laterally spaced apart side walls configured to receive an animal when positioned therewithin;
an entrance gate pivotably connected to one end portion of said frame structure, said entrance gate being movable between an open position for allowing entry into said frame structure and a closed position for blocking exit from said frame structure;
a retainer member pivotably connected to said entrance gate, said retainer member being selectively movable for engaging an animal positioned within said frame structure adjacent a rear portion of the animal;
an exit gate pivotably connected to the other end portion of said frame structure, said exit gate including a pair of first and second gates, said first gate being movable between an open and a closed position and functioning as a headrest for the animal's head and neck when moved into its open position, said second gate being movable between an open and a closed position and including a movable stanchion member, said second gate mating with said first gate to define an opening therein when said first gate is in its open position and said second gate is in its closed position, said stanchion member being movable to change the size of the opening associated with said exit gate and to engage the head and neck area of an animal positioned within said frame structure so as to immobilize the head and neck area of the animal with respect to said stanchion member;
at least one belly strap for further immobilizing the animal when positioned within said frame structure, and an elongated arm member operatively coupled to said at least one belly strap, said elongated arm member being pivotally movable between a retracted position wherein said at least one belly strap is not in engagement with the animal and an extended position wherein said at least one belly strap engages the animal's midsection;
a first fluid-operated cylinder assembly adapted for pivotally rotating said frame structure between a vertical upright position adjacent the supporting surface and a horizontal position on the supporting surface;
an arm assembly operatively connected to said frame structure for connecting to said first fluid-operated cylinder assembly for pivotally rotating said frame assembly between its vertical upright position and its horizontal position, said frame structure being supported by said arm assembly in its vertical upright position above ground level.

23. A chute for immobilizing an animal mounted for rotation on a supporting surface, said chute comprising:
a frame structure including a top portion and two laterally spaced apart side walls configured to receive an animal when positioned therewithin;
an entrance gate pivotably connected to one end portion of said frame structure for allowing entry into said frame structure, said entrance gate including a pair of first and second gates, said first and second gates being each movable between respective open and closed positions;
a retainer member pivotally connected to said entrance gate, said retainer member being pivotally connected to one of said first and second entrance gates and being selectively movable for engaging an animal positioned within said frame structure adjacent a rear portion of the animal;
an exit gate pivotably connected to the other end portion of said frame structure, said exit gate being movable between an open position allowing exit from said frame structure and a closed position blocking exit from said frame structure, said exit gate defining an opening wherein the head of an animal can pass therethrough when the animal is positioned within said frame structure, and a stanchion member pivotally mounted on said exit gate, said stanchion member being movable to change the size of the opening associated with said exit gate and to engage the head and neck area of an animal positioned within said frame structure so as to immobilize the head and neck area of the animal with respect to said stanchion member;
at least one belly strap for further immobilizing the animal when positioned within said frame structure, and an elongated arm member operatively coupled to said at least one belly strap, said elongated arm member being pivotally movable between a retracted position wherein said at least one belly strap is not in engagement with the animal and an extended position wherein said at least one belly strap engages the animal's midsection;
a first fluid-operated cylinder assembly adapted for pivotally rotating said frame structure between a vertical upright position adjacent the supporting surface and a horizontal position on the supporting surface;
an arm assembly operatively connected to said frame structure for connecting to said first fluid-operated cylinder assembly for pivotally rotating said frame assembly between its vertical upright position and its horizontal position, said frame structure being supported by said arm assembly in its vertical upright position above ground level.

* * * * *